United States Patent [19]

Foley et al.

[11] Patent Number: 5,725,950
[45] Date of Patent: Mar. 10, 1998

[54] COATING OF PRECERAMIC ARTICLES WITH SILICON AND/OR CARBON DURING PYROLYSIS TO CERAMIC

[75] Inventors: Paul Foley, Oldwick; Linda C. Sawyer, Chatham, both of N.J.

[73] Assignee: Hoechst Celanese Corp., Somerville, N.J.

[21] Appl. No.: 909,369

[22] Filed: Sep. 19, 1986

[51] Int. Cl.$^6$ ............... B32B 1/00; B32B 18/00; B32B 33/00
[52] U.S. Cl. ............ 428/367; 428/368; 428/379; 428/389; 427/215; 427/228; 427/229
[58] Field of Search .................. 427/227, 228, 427/249, 255, 255.4, 215, 229; 423/345; 428/367, 368, 902, 698, 446

[56] References Cited

U.S. PATENT DOCUMENTS

| | | | |
|---|---|---|---|
| 3,969,124 | 7/1976 | Stewart | 427/249 |
| 4,029,844 | 6/1977 | Olcott | 427/228 |
| 4,059,468 | 11/1977 | Bouillon | 427/227 |
| 4,342,712 | 8/1982 | Yajima et al. | 423/345 |
| 4,535,007 | 8/1985 | Cannady | 427/228 |
| 4,639,501 | 1/1987 | Seyferth | 423/345 |

*Primary Examiner*—Daniel J. Jenkins
*Attorney, Agent, or Firm*—John M. Genova

[57] ABSTRACT

A process for the preparation of carbon and/or silicon coated ceramic fibers is disclosed involving contact of a preceramic fiber with a hydrocarbon or a silane which decomposes at a temperature no higher than 500° C. at 1 atmosphere.

8 Claims, No Drawings

COATING OF PRECERAMIC ARTICLES WITH SILICON AND/OR CARBON DURING PYROLYSIS TO CERAMIC

RIGHTS OF THE GOVERNMENT

This invention was made with Government support under a subcontract with Dow Corning under Prime Contract No. F33615-83-C-5006 awarded by the Department of Defense (DOD). The Government has certain rights in this invention.

FIELD OF THE INVENTION

This invention relates to the production of coated ceramic-shaped articles from organosilicon polymers.

More particularly, the invention relates to imparting a coating of carbon and/or silicon to preceramic-shaped articles such as fibers while pyrolyzing the same to ceramics.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, e.g., "Siloxanes, Silanes and Silazanes in the Preparation of Ceramics and Glasses" by Wills, et al., and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, shaped articles such as fibers. Such fibers are spun from organosilicon preceramic polymers, and then cured and pyrolyzed to their ceramic form. The low molecular weight and highly branched structure of typical preceramic polymers, however, alters the spinning and subsequent fiber handling behavior of these polymers from that of conventional polymers. In particular, gelation and foaming tendencies in the melted polymers used for melt spinning may lead to the presence of undesirable flaws in the resulting fiber. Such flaws are undesirable in fine diameter fibers since they are believed to be the source of cracking and lowered tensile strength. Furthermore, because of the low molecular weight of the preceramic polymers used, the fibers spun therefrom have relatively low tensile strength and are difficult to handle in spinning, curing, and subsequent pyrolysis operations.

It is known that ceramic fibers can be improved if compounded or admixed with certain materials which enhance their physical properties such as carbon or silicon. Materials of this type which are physical mixtures of preceramic fibers with various fillers are disclosed in U.S. Pat. Nos. 4,340,619, 4,404,153, 4,482,689 and 4,460,640, the disclosure of said patents being incorporated by reference.

The process of the instant invention differs from said composite materials and prior art processes for their preparation in that a carbon and/or silicon compound is introduced during the pyrolysis step thereby converting the polymer to a ceramic which has a carbon and/or silicon coating.

SUMMARY OF THE INVENTION

Accordingly, a primary object of the present invention is to provide an improved process for the production of coated ceramic fibers from organosilicon preceramic polymers involving the use of carbon and/or silicon compounds during pyrolysis.

Another object of the present invention is to provide an improved process for the production of organosilicon ceramic fibers having high tensile strength.

Another object of the present invention is to provide an improved process for the production of ceramic fibers based upon organosilicon preceramic polymers, which fibers have improved handleability, e.g., increased toughness and protection of the organosilicon preceramic material from abrasion and the atmosphere.

These and other objects, aspects and advantages, as well as the scope, nature and utility of the present invention, will be apparent from the following description and appended claims.

DESCRIPTION OF THE PREFERRED EMBODIMENTS

The Organosilicon Preceramic Polymers

Organosilicon preceramic polymers are well known in the art. Such polymers contain silicon, carbon and/or nitrogen, and are fiber-forming, and can be cured and pyrolyzed to ceramic form. See, e.g., U.S. Pat. Nos. 4,310,651; 4,312,970; 4,342,712; 4,482,689; and 4,340,619; which are incorporated herein by reference.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbosilane.

Preferably, the organosilicon preceramic polymers utilized in the present invention consist essentially of silicon, carbon, nitrogen and oxygen. Such polymers are typically prepared by reacting a disilazane and a dichlorodisilane or methylchlorodisilane.

Most preferably, the organosilicon preceramic polymers of the present invention are characterized as polysilazanes prepared from methylchlorodisilanes and hexamethyldisilazane. Particularly preferred are the polysilazanes, containing N—Si—Si—N linkages. Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be a methyl, ethyl, phenyl or vinyl group.

Such organosilicon preceramic polymers may be further modified, for example, by incorporating vinyl functionality by reacting with the polymer itself. This may be achieved, for example, by co-reacting the polymer with a vinyl (Vi) halosilane such $ViR_1R_2SiCl$, where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

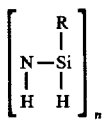

linked together by $Si_2W_2$ bridges of formula II.

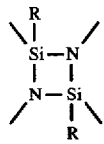

wherein R is hydrogen, a lower alkyl group having from 1 to about 6 carbon atoms, a substituted or unsubstituted vinyl group, a substituted or unsubstituted alkyl group, a substituted or unsubstituted benzyl group, a substituted or unsubstituted lower aryl group having from 6 to about 10 carbon atoms, a tri(lower)alkyl or di(lower)alkylsilyl group, a di(lower)alkylamino group, a lower alkoxy group having from 1 to about 6 carbon atoms and n is an integer greater than one. The substituted groups are substituted with lower alkyl and lower aryl groups.

These polymers form novel ladder-like or planar array structures that are soluble in common organic solvents, stable at room temperature and thermally stable up to about 200° C. The ladder-like or planar array polymers of the present invention are formed in high yield by reaction of the cyclic and/or linear residues in the presence of a basic catalyst capable of deprotonating an NH function adjacent to silicon.

These polymers and their preparation are described more fully in U.S. Pat. No. 4,482,669, to Seyferth et al., assigned on its face to Massachusetts Institute of Technology, which patent is herein incorporated by reference.

Molecular weight ($M_n$) for the above organosilicon preceramic polymers may vary from about 500 to 20,000, but typically 2,000 (g/mole-GPC method); higher molecular weight polymers are preferred. These polymers may also have softening temperatures ($T_s$) of about 50° C. to 308° C., preferably about 60° C. to 200° C., and most preferably 70° C. to 150° C.

Spinning of the Fibers

As indicated earlier, the above-described organosilicon preceramic polymers are dry spun, melt spun or extruded as fibers or filaments.

To melt spin, the solid organosilicon polymer is melted at a temperature and rate sufficient to avoid gelation and foaming, and substantially immediately thereafter the melted polymer is preferably spun or extruded to form optically flaw-free, fine diameter organosilicon preceramic fiber.

Prior to spinning, any gel detected in the polymer blend should be removed such as by filtration. In addition, the polymer should be essentially free of other contaminants such as small insoluble particulates or bubbles.

The relatively short residence time of the polymer in the melt is critical to achieving optically flaw-free, fine diameter fibers. If an organosilicon polymer is brought up to a melt-processable or extrudable temperature and held at such temperatures for too long a period time, gelation will occur, which in turn will lead to the presence of noticeable flaws in the fiber and a concomitant loss of tensile properties. In addition, the melt temperature of the organosilicon polymer should be less than that needed to cause foaming of the polymer, which foaming will also lead to the presence of voids or flaws in the fiber. The typical organosilicon polymer is significantly more melt sensitive as compared to other conventional fiber-forming polymers, e.g., polyethylene terephthalate.

The actual melt temperatures may vary, but will generally be above the softening temperature ($T_s$) of the organosilicon polymer, but below that at which foaming, gelation or other degradation occurs within the total melt residence time. Typically, such melt temperature will range from about 30° C. to 130° C., and most preferably 60° C. to 80° C. above the $T_s$ of the polymer blend.

As the preceramic fibers are melt spun or extruded, fiber handling is preferably minimized to avoid abrasion of the fibers sufficient to cause fiber breakage during fiber take-up and/or sufficient to induce latent stressing sufficient to cause fiber breakage during subsequent curing and pyrolysis to ceramics. Thus, those type of conventional fiber take-up apparatus which induce high levels of stress in fiber are preferably not used. The preceramic fibers as spun are relatively brittle due to their relatively low molecular weight as compared to conventional fiber-forming polymers.

The preceramic fibers as spun may be taken up in any appropriate take-up speed. Take-up speed of up to about 1400 meters/minute, typically 100 to 1000, and preferably 300 to 800, may be used.

To dry spin, the solid organosilicon polymer is dissolved in a solvent at a relatively high polymer solids concentration, and thereafter the polymer is spun or extruded to form flaw-free organosilicon preceramic fiber.

Any solvent in which the organosilicon polymer may be dissolved at the relatively high solids concentration may be used. Suitable aliphatic hydrocarbon solvents may include those having from 1 to 8 carbon atoms and having boiling points ranging from about 0° C. to about 190° C. Typical aliphatic hydrocarbon solvents include n-hexane, cyclohexane, cyclo-hexene, n-pentane, cyclopentadiene, iso-octane, acetonitrile, dichloroethane, trichloroethane, hexachloroethane, chloroform, methylchloroform, methylene chloride, methyl acetate, ethyl acetate, carbon tetrachloride, and tetrahydrofuran. Suitable aromatic hydrocarbon solvents may include those having from 6 to 10 carbon atoms and have boiling points ranging from about 70° C. to 180° C. Typical aromatic hydrocarbon solvents include toluene, xylene, styrene, benzene, chlorobenzene, dichlorobenzene, ethylbenzene, and isopropylbenzene. Toluene and xylene are particularly preferred.

Prior to spinning, any gel detected in the polymer should be removed such as by filtration. In addition, the polymer should be essentially free of other contaminants such as small insoluble particulates.

As indicated above, the relatively high solids concentration of the polymer in the spinning solution is critical to achieving a self-supporting threadline with these low-molecular weight polymers. If insufficiently high and organosilicon polymer solids concentrations are used, threadline breakdown will frequently occur. Preferably, polymer solids concentrations of at least about 70 percent, and most preferably at least about eighty percent are used.

After dissolution and prior to spinning, the polymer should be maintained in solution in an essentially gel-free state, i.e., kept under conditions insufficient to cause gel formation of polymer in the solvent.

The actual solution temperatures at spinning may vary, but will generally be near the boiling point of the solvent (to improve solvent evaporation) but below that at which foaming, gelation or other degradation occurs within the total dry spinning residence time. Typically, at spinning such solution temperatures will be between about 70° C. and 250° C., preferably 70° C. to 200° C. and most preferably 90° C. to 160° C.

As the preceramic fibers are dry spun and solvent-extracted, fiber handling is preferably minimized to avoid abrasion of the fibers sufficient to cause fiber breakage during fiber take-up and/or sufficient to induce latent stressing sufficient to cause fiber breakage during subsequent curing and pyrolysis. Thus, those types of conventional fiber take-up apparatus which induce high levels of stress in fiber are preferably not used. The preceramic fibers during and after spinning and solvent extraction are relatively brittle due to their relatively low molecular weight as compared to conventional fiber-forming polymers.

Curing of the Spun Fibers

The novel process of this invention includes curing the preceramic fibers as spun by contacting the same with gaseous hydrogen halide which is preferably admixed with an inert gas such as nitrogen and argon, etc. The curing of the preceramic polymer can take place during either of two stages. It can be cured in a batch manner after it has been formed into a desired shape, e.g. fibers can be made and cured after they have been placed on a take-up reel. The most preferred method of cure, however, is to treat the fiber immediately after it is spun or before it is placed on the conventional take-up reel.

It is also possible to use curing agents other than hydrogen halide and typical prior art curing agents are disclosed in U.S. Pat. Nos. 3,853,567, 4,535,007 and 4,399,232, the disclosures of which are incorporated by reference. The temperature employed for curing can range from room temperature up to the glass transition temperature of the particular polymer. It is preferred to operate at temperature at least 20° C. below said glass transition temperature.

Following the above-described curing, the preceramic polymers are ready to be coated with carbon and/or silicon in accordance with the novel process of this invention.

This is accomplished by contacting the preceramic polymers with a carbon-containing compound or a silicon-containing compound during pyrolysis.

The expression "carbon-containing compound" is intended to mean a hydrocarbon which decomposes at no higher than 500° C. at 1 atmosphere of pressure. The most preferred hydrocarbons are acetylene, propylene and isoprene, although any aromatic, aliphatic cycloaliphatic or olefinic hydrocarbon meeting the above criteria can be used.

The expression "silicon-containing compound" is intended to mean any compound of the formula $R_4Si$, wherein each R is hydrogen, $C_1-C_6$ alkyl, phenyl or vinyl providing that said compound decomposes at a temperature of at least 500° C. and 1 atmosphere. The most preferred component is silane.

The treatment is usually carried out in an inert atmosphere of nitrogen, argon or the like at atmospheric pressure. Pyrolysis temperatures may be from 500°–2000° C., preferably from 600° C. to 1600° C., and most preferably from 1100° C. to 1400° C.

The amount of silicon of carbon-containing compound is not critical and enough is used to get the desired coating on the ceramic fiber.

EXAMPLE 1

An organosilicon preceramic polymer is prepared according to the general procedure of Example 1 of U.S. Pat. No. 4,340,619 and is introduced into a melt extruder after filtration. The polymer is passed through a spinneret at a temperature of 180° C. and immediately passed through a curing chamber into which a gas mixture of hydrogen chloride and nitrogen is continuously flowed at about 150 ml/min. and is then collected on a take-up reel.

Fibers were removed from said take-up reel and placed in an alumina boat.

A control experiment was carried out wherein said fibers were subjected to the following heat treatment in argon flowing at 100 cc/min.

| Temperature | Time |
| --- | --- |
| RT–500° C. | 1 hr. |
| 500–1200° C. | 2 hrs. |
| Cool to RT (room temperature) | |

A second experiment was conducted wherein acetylene at flow rates of 15 mL/min. and 5 mL/min. was introduced at the RT-500° C. stage, the rest of the heat treatment being identical.

The physical properties of the resulting ceramic fiber were as follows:

| Sample | Tensile Strength Ksi[1] | Elastic Modulus Msi[2] | Fiber Diameter (micrometers) |
| --- | --- | --- | --- |
| Control | 37 | 11 | 19 |
| Acetylene | 96 | 12 | 21.5 |

[1]1,000 lbs/sq. in.
[2]1,000,000 lbs/sq. in.

The physical properties of the fibers coated at the two different flow rates of acetylene were identical although the thickness of the carbon coating was different at 0.7 micrometers for the 15 mL/min. and 0.3 micrometers for the 5 mL/min.

EXAMPLE 2

The control of Example 1 (after 1200° C. heat treatment) was coated with acetylene to produce a carbon coating of 0.7 micrometers. Its physical properties were as follows:

| Tensile Strength Ksi[1] | Elastic Modulus Msi[2] | Fiber Diameter (micrometers) |
| --- | --- | --- |
| 68 | 17 | 20 |

[1]1,000 lbs/sq. in.
[2]1,000,000 lbs/sq. in.

Thus it can be seen that there is a dramatic difference in strength when ceramic fibers are coated after pyrolysis (Example 2) than coating preceramic polymers during initial pyrolysis.

EXAMPLE 3

The procedure of Example 1 was repeated with the exception that 10% silane in argon was used instead of acetylene. A silicon metal coated ceramic was obtained.

What is claimed is:

1. A process for producing ceramic fibers coated with elemental carbon or silicon metal which comprises pyrolyzing fibers formed from an organosilicon preceramic polymer to produce ceramic fibers and introducing sufficient amounts of a silicon-containing compound or a hydrocarbon during at least a part of said pyrolyzing step to form a silicon metal or carbon coating on said ceramic fiber, said silicon-containing compound and hydrocarbon having a decomposition temperature no higher than 500° C. at 1 atmosphere.

2. The process of claim 1 wherein said hydrocarbon is acetylene, propylene or isoprene.

3. The process of claim 1 wherein said silicon-containing compound has the formula $$R_4Si$$

wherein each R is hydrogen, $C_1$–$C_6$ alkyl, phenyl or vinyl or $SiR_3$.

4. The process of claim 3 wherein each R is hydrogen.

5. The product produced by the process of claim 1.

6. The product produced by the process of claim 2.

7. The product produced by the process of claim 3.

8. The product produced by the process of claim 4.

\* \* \* \* \*